(12) United States Patent
Chatterjee et al.

(10) Patent No.: US 12,373,402 B1
(45) Date of Patent: Jul. 29, 2025

(54) RESOURCE EFFICIENT SCHEMA OBJECT CREATION SYSTEM

(71) Applicant: SAP SE, Walldorf (DE)

(72) Inventors: Sunabha Chatterjee, Kolkata (IN); Hemant Kumar Shukla, Jabalpur (IN); Tanay Jayant Kayastha, Nandgaon (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/672,513

(22) Filed: May 23, 2024

(51) Int. Cl.
*G06F 16/21* (2019.01)

(52) U.S. Cl.
CPC ................. *G06F 16/211* (2019.01)

(58) Field of Classification Search
CPC .................................................. G06F 16/211
See application file for complete search history.

(56) References Cited

U.S. PATENT DOCUMENTS

| 2014/0095432 | A1* | 4/2014 | Trumbull | G06F 16/219 707/610 |
| 2019/0251180 | A1* | 8/2019 | Lachambre | G06F 16/258 |
| 2022/0197892 | A1* | 6/2022 | Freedman | G06F 16/27 |
| 2023/0376479 | A1* | 11/2023 | Freedman | G06F 16/27 |

* cited by examiner

*Primary Examiner* — Tyler J Torgrimson
(74) *Attorney, Agent, or Firm* — Sterne, Kessler, Goldstein & Fox P.L.L.C.

(57) ABSTRACT

System, method, and various embodiments for a resource efficient schema object creation system are described herein. An embodiment operates by receiving a schema-change request at a first node of a cluster of computing nodes. The first node creates and populates a schema object in a shared storage, based on the schema-change request. An entry is generated in a reverse transaction log, the entry corresponding to the schema object stored in the shared storage device. A coordinator node is configured to read the entry from the reverse transaction log, update a schema, and generate an entry in a forward transaction log. The first node executes the entry in the forward transaction log, wherein the executing comprises updating a catalog of the first node to include the schema object stored in the shared storage, wherein upon a completion of the updating, the schema object is accessible by the first node.

20 Claims, 5 Drawing Sheets

RESOURCE EFFICIENT SCHEMA OBJECT CREATION SYSTEM

BACKGROUND

A data definition language (DDL) statement is used to modify the schema of a database, while a data manipulation language (DML) statement is used to modify the data stored in the database. DML operations are often more computationally intensive than DDL operations. As such, to optimize resource consumption, oftentimes a first resource-light computing device will be set up to perform DDL operations, while a second more resource-rich computing device will be set up to perform DML operations. However, computational bottlenecks, starvation, and other issues may arise when DDL operations include DML operations and are performed by the first resource-light computing device.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a resource efficient schema object creation system.

A data definition language (DDL) statement is used to modify the schema of a database, while a data manipulation language (DML) statement is used to modify the data stored in the database. DML operations are often more computationally intensive than DDL operations. However, some DDL operations may include DML operations as well. As such, computational bottlenecks, starvation, and other issues may arise when DDL operations that include DML operations are performed by computing devices that are configured to perform primarily DDL operations and are not computationally equipped to perform the corresponding DML operations in a computationally efficient manner.

Figure 1:
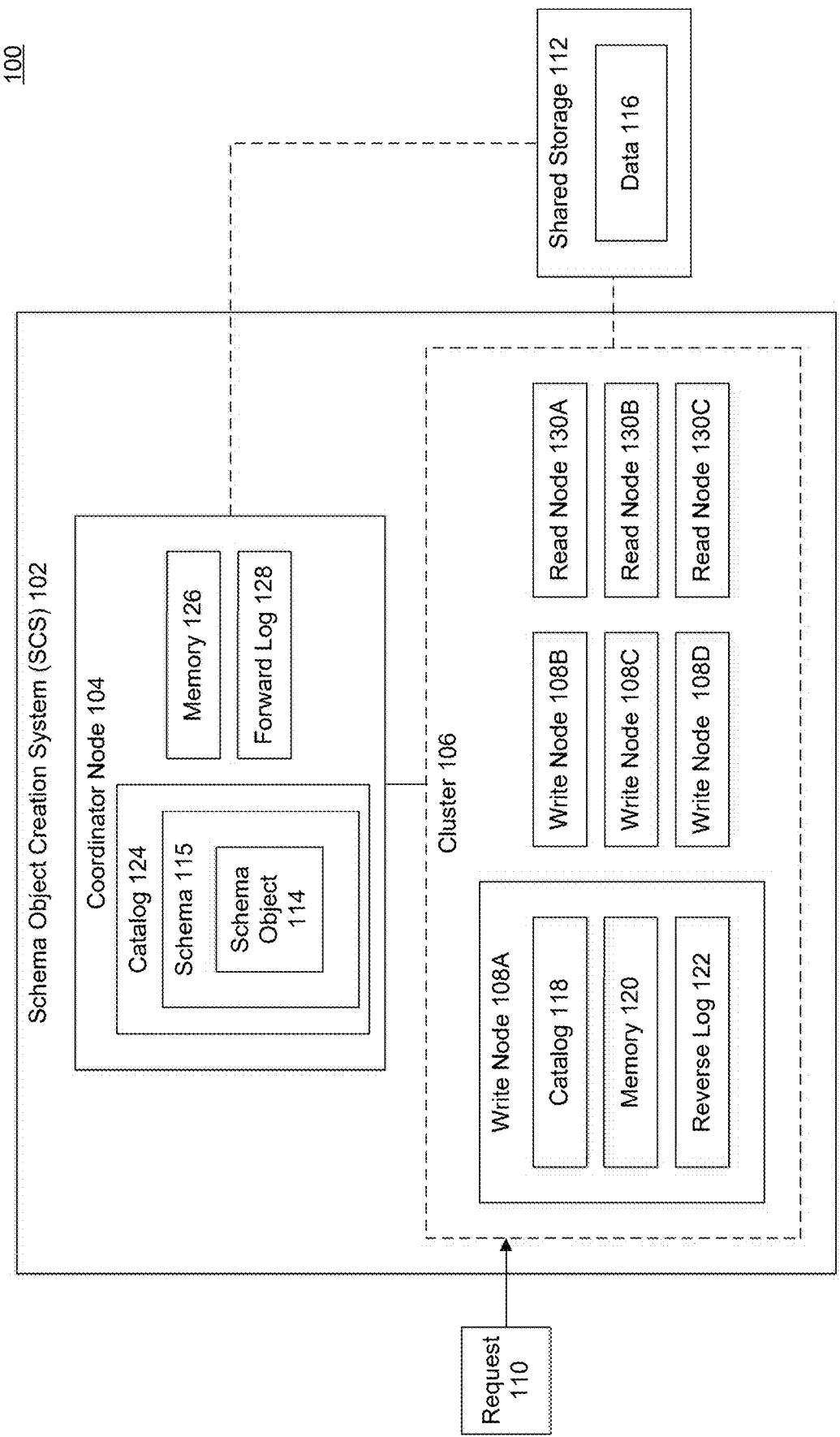
FIG. 1 is a block diagram illustrating example functionality for a schema object creation system (SCS), according to some embodiments.

FIG. 1 is a block diagram 100 illustrating example functionality for a schema object creation system (SCS) 102, according to some embodiments. SCS 102 may improve the computing efficiency in performing DDL and DML operations and increase system throughput. As noted above, DML operations are often more computationally intensive than DDL operations. As such, to optimize resource consumption, a first resource-light computing device (e.g., coordinator node 104) may be set up to perform DDL operations, while a second more resource-rich computing device (e.g., write node 108A) may be set up to perform DML operations.

However, some DDL operations may include resource-intensive DML operations as well. Rather than burdening the coordinator 104 with performing the resource-intensive DML operations, which the coordinator 104 may not be computationally equipped to perform in a computationally efficient manner, SCS 102 may offload the DML operations (of a DDL command) to a write node 108A which may have greater computational capacity (relative to the coordinator 104) to perform the DML operations in a computationally efficient manner.

In some embodiments, SCS 102 may reassign DML operations (of a DDL request) which would normally be processed by the coordinator 104, to be performed by a write node 108A, which may be better computationally equipped to perform the DML operations relative to the coordinator 104. This task redistribution in a computing architecture, may cause a computing system to perform DDL requests which include DML operations more efficiently (e.g. using less time, fewer computing resources, and more financially cost effectively) than was otherwise possible in conventional computing architecture set ups.

In some embodiments, SCS 102 may receive a request 110 to perform a DDL operation or DML operation. A DDL operation may include one or more commands to modify the schema 115 of a database (e.g., add, update, or delete an existing schema object in shared storage 112) as maintained by coordinator 104. In some embodiments, different nodes of cluster 106 may each maintain their own local copy of the schema 115, which may be periodically updated upon the replay of a forward log 115. Meanwhile, a DML operation may include one or more commands to modify the data 116 pointed to by, or organized in accordance with the schema 115 of the database (e.g., add, update, delete data values). DML operations are often require greater computing resources and take more time to perform than DDL operations.

The request 110 may be received by a cluster 106. Cluster 106 may include any organizational set up of two or more computing devices which are communicatively coupled to access shared storage 112. Cluster 106 may include any networking setup, including but not limited to a cloud computing environment.

In the example illustrated, cluster 106 may include two different types of computing devices: write nodes 108A-D and read nodes 130A-C. In some embodiments, the cluster 106 may include the coordinator node 104. Write nodes 108A-D, referred to herein generally as writer nodes 108, may be configured to perform DML or write operations on data 116 of shared storage 112. The write operations may include adding data, modifying data, or deleting data. Read nodes 130A-C, referred to here as reader nodes 130, may be configured to perform read-only operations on data 116 of shared storage 112.

In some embodiments, the all the nodes of cluster (both 108A-D and 130A-C) may be read-write nodes that are configured to perform write and/or read operations on data 116 of shared storage 112. In other embodiments, cluster 106 may include writer nodes 108, reader nodes 130, and read-write nodes. As used herein, the term write node 108 or write node 108A-D may refer to any node or computing device configured to perform DML write operations on data 116 of shared storage 112.

In the example illustrated, cluster 106 may include multiple writer nodes 108A-D all of which are configured to write to data 116 of shared storage 112 (which may include a database). To ensure data consistency on the data 116 of shared storage 112, the operations of cluster 106, particularly write nodes 108, may be managed by a coordinator 104.

Coordinator 104 may be a computing device (or set of computing devices) configured to manage and/or coordinate the write operations of write nodes 108A-D on shared storage 112 to ensure data consistency. For example, coordinator 104 may ensure that no two write nodes 108A-D are writing to the same record of data 116 at the same time. Coordinator 104 may also maintain and update the schema 115, which may be shared with the nodes of cluster 106 via the forward log 128. In some embodiments, coordinator 104 may be the only computing device configured to update schema 115 (e.g., write nodes 108 may not be able to update the schema 115, but may receive updates to schema 115 from coordinator 104, and update their own local copies of schema 115 for synchronization with schema 115).

Schema 115 may include an organizational structure for shared storage 112. In some embodiments, shared storage 112 may include a database, such as a relational database. The schema 115 may indicate which schema objects (e.g., such as tables, rows, columns, indexes, views, etc.) have been created. The data 116 may then be stored or organized in accordance with the schema 115. As described in greater detail below, schema object 114 may refer to a new schema object that is being created (or updated) in response to request 110.

Request 110 may include a request from a user or another system to perform some operation(s) with respect to shared storage 112. Request 110 may include one or more data (DML) operations (e.g., read, write, modify, or delete) or one or more schema (DDL) operations (e.g., adding columns, adding a table, removing a column, creating an index, modifying a table, etc.).

In some embodiments, request 110 may be received by a write node 108A. In normal operations, upon receiving request 110, write node 108A may first determine whether the request is for a DML operation or a DDL operation. While computationally intensive DML operations may be performed locally on write node 108A, computationally light DDL operations are provided to coordinator 104 to perform.

However, as noted above, some DDL operations may include DML operations. For example, a request 110 to create a new schema object may include both the DDL operation of creating the new schema object 114, and the DML operation of populating the schema object 114 with a portion of data 116. For example, creating a new index would require that the index be populated with some subset of data 116. The schema object 114 may include any database object, such as a table, index, view, or other logical structure to store, organize, or reference at least a portion of data 116 stored in shared storage 112. In some embodiments, the modification of an existing schema object (e.g., adding a new column to a table) may also include DML operations to populate the new column with data 116. Any DDL operation that includes DML operations may be referred to herein as a heavy DDL operation, because of the increased computational workload required to fulfill the request.

To avoid the problems that may arise with a coordinator 104 performing a heavy DDL operation, SCS 102 may include or provide an enhanced DDL execution process. Rather than simply immediately transferring all DDL requests 110 to coordinator 104, write node 108A may perform an enhanced checking process. Upon receiving a request 110 and determining that request 110 is for a DDL operation, write node 108A, under the enhanced operations of SCS 102, may determine whether the DDL operation is a heavy DDL operation or a normal DDL operation.

In some embodiments, a heavy DDL operation may include any DDL operation that includes one or more DML operations in which data 116 is to be populated (e.g., added, copied, moved) in accordance with the DDL operation (which may include a create command for a new schema object 114). A normal DDL operation may include changing a table or column name, or other schema modifications that do not require the population of a new schema object 114 with data 116. In some embodiments, write node 108A may include a list of the heavy DDL operations.

If the request 110 is determined by write node 108A to be for a normal DDL operation, then the request 110 may be provided to coordinator 104 for processing without any additional processing by write node 108A. If, however, the request 110 is determined to be for a heavy DDL operation (such as a create index request), then write node 108A may perform additional operations prior to transferring the request 110 to coordinator 104.

In some embodiments, read requests 110 may be directly received by read nodes 130A-C. In some embodiments, cluster 106 may include a gatekeeper node (not illustrated) that determines whether to provide the request 110 to coordinator 104, a write node 108, or a read node 130, in accordance with the enhanced DDL execution process described herein. The gatekeeper node may determine that heavy DDL operations are first provided to a write node 108A, and then provided to coordinator 104, which may be responsible for maintaining and updating schema 115 of shared storage 112.

Figure 2:
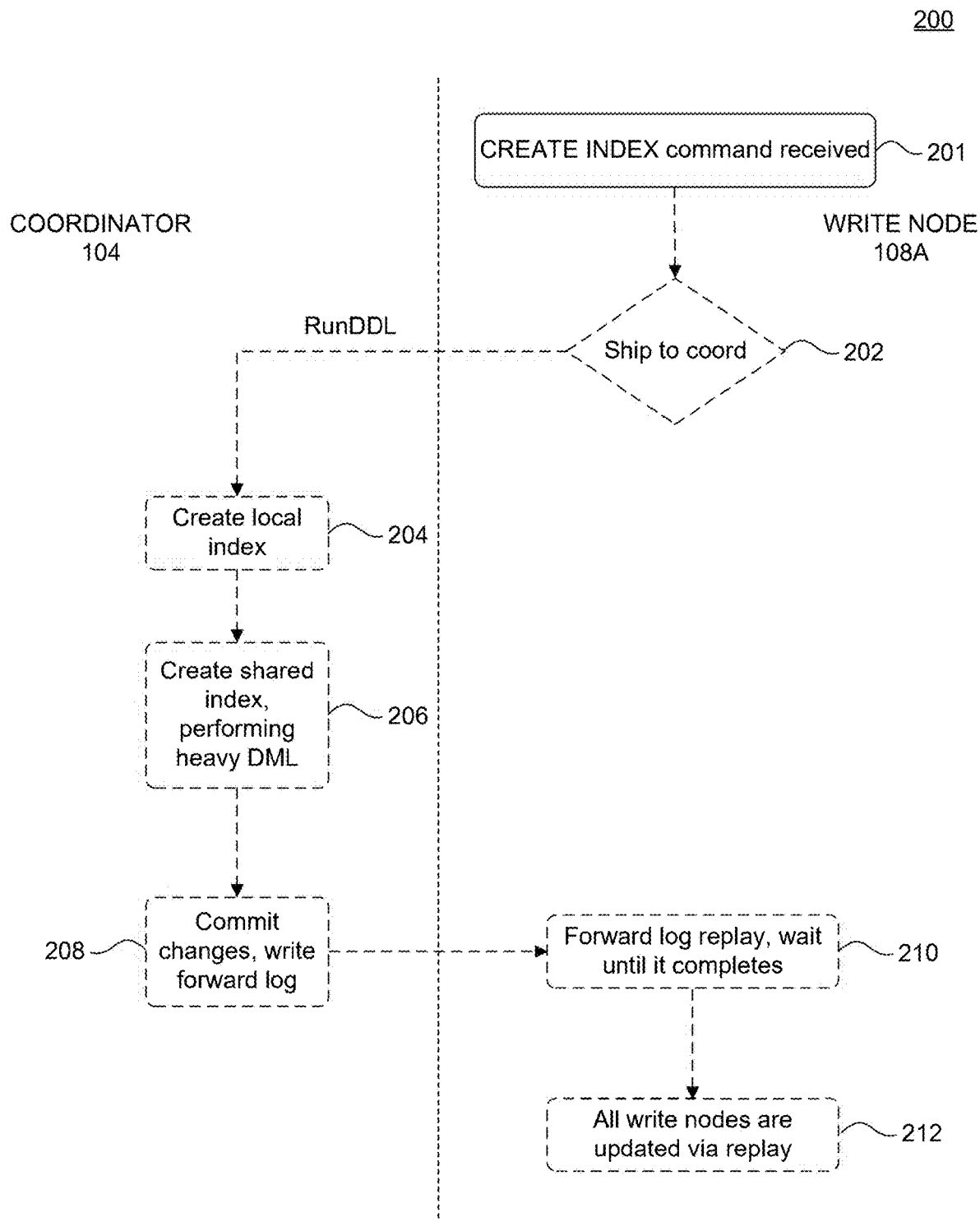
FIG. 2 illustrates an example flow of operations without enhanced DDL processing, according to some embodiments.

FIG. 2 illustrates an example flow of operations 200 without enhanced DDL processing, according to some embodiments. At 201, a request 110 including a create index command is received at write node 108A. At 202, the write node 108A may determine that the request 110 includes a DDL operation, and may provide or transfer the request 110 to coordinator 104, without further determination as to whether any DML operations are performed as part of the DDL operation.

At 204, coordinator 104 may create a local index. Returning to FIG. 1, in some embodiments, both coordinator node 104 and each write node 108A-D, may maintain its own version of a catalog (124, and 118, respectively). Data catalog (118, 124) may include metadata that provides a view of the available data sources (e.g., shared storage 112) and schema 115. While schema 115 may define the blueprint of the data, catalog (118, 124) may allow the nodes (104, 108) to navigate, access, and update the data 116. Catalog 124 may refer to a data catalog maintained by coordinator 104, including schema 115. Catalog 118 may refer to a data catalog maintained by a write node 108A, which may include its own copy of schema 115 which is updated through the replay of forward log 128 which may be shared by coordinator 104 with the nodes of cluster 106. The components of write node 108A may be included across the other write nodes 108B-D of the cluster 106, but for simplicity, are only illustrated in write node 108A.

Returning to step 204 of FIG. 2, coordinator 104 may update its catalog 124 with a new index object in accordance with request 110. A this point, the schema 115 may remain unchanged.

At 206, coordinator 104 may create a schema object 114 in schema 115. The schema object 114 may be an index (as indicated by request 110) and correspond to the index created in the local catalog 124 (in step 204). In this step, coordinator 104 may be tasked with populating the index with data 116, which is a task that coordinator 104 may not be computationally equipped to handle efficiently.

For example, in a cloud environment, coordinator 104 and several auxiliary services may be launched to perform the activities of step 206. The auxiliary services may perform related operations such as monitoring the health of coordinator 104, fetch logs, etc. However, because coordinator 104 may not computationally equipped to handle the computationally expensive DML operations, coordinator 104 may request or consume additional resources from the cloud computing environment, which may starve the auxiliary services of their necessary computing requirements. Thus, the auxiliary services may not be able to function properly.

Furthermore, because coordinator 104 is not equipped to perform DML operations in a resource efficient manner, the performance of these DML operations may take a longer than necessary period of time, during which the nodes of cluster 106 may remain paused or suspended, and new requests 110 may be rejected or queued. This queue or backup may result in a system crash.

At 208, after the DML operations have been completed and the index populated at 206, the changes to schema 115 may be committed. Coordinator 104 may also update a forward log 128 (as illustrated in FIG. 1). Forward log 128 may include a log of schema changes that are implemented by coordinator 104, which may then be propagated to any or all nodes of cluster 106. In some embodiments, the forward log 128 may be provided to the nodes of cluster 106 periodically, or at the beginning of transactions. This may allow for a logical sharing of schema 115, as maintained by coordinator 104, with any nodes of cluster 106.

At 210, the forward log 128 may be replayed by the various write nodes 108A-D and read nodes 130A-C, during which the nodes (108, 130) may update their local catalogs 118 to reflect the new schema object 114. In some embodiments, the system may be paused during this update process. In some embodiments, existing write commands may be allowed to be completed, but new write commands may be rejected or queued until step 210 completes.

At 212, the replay of the forward log 128 may be completed and the system may resume processing of new or queued requests 110. For example, both write node 108A and any other remaining write nodes may replay the forward log 128. In some embodiments, the replay of the forward log 128 may result in an updating of a local schema stored at any of the write nodes performing the replay.

Figure 3:
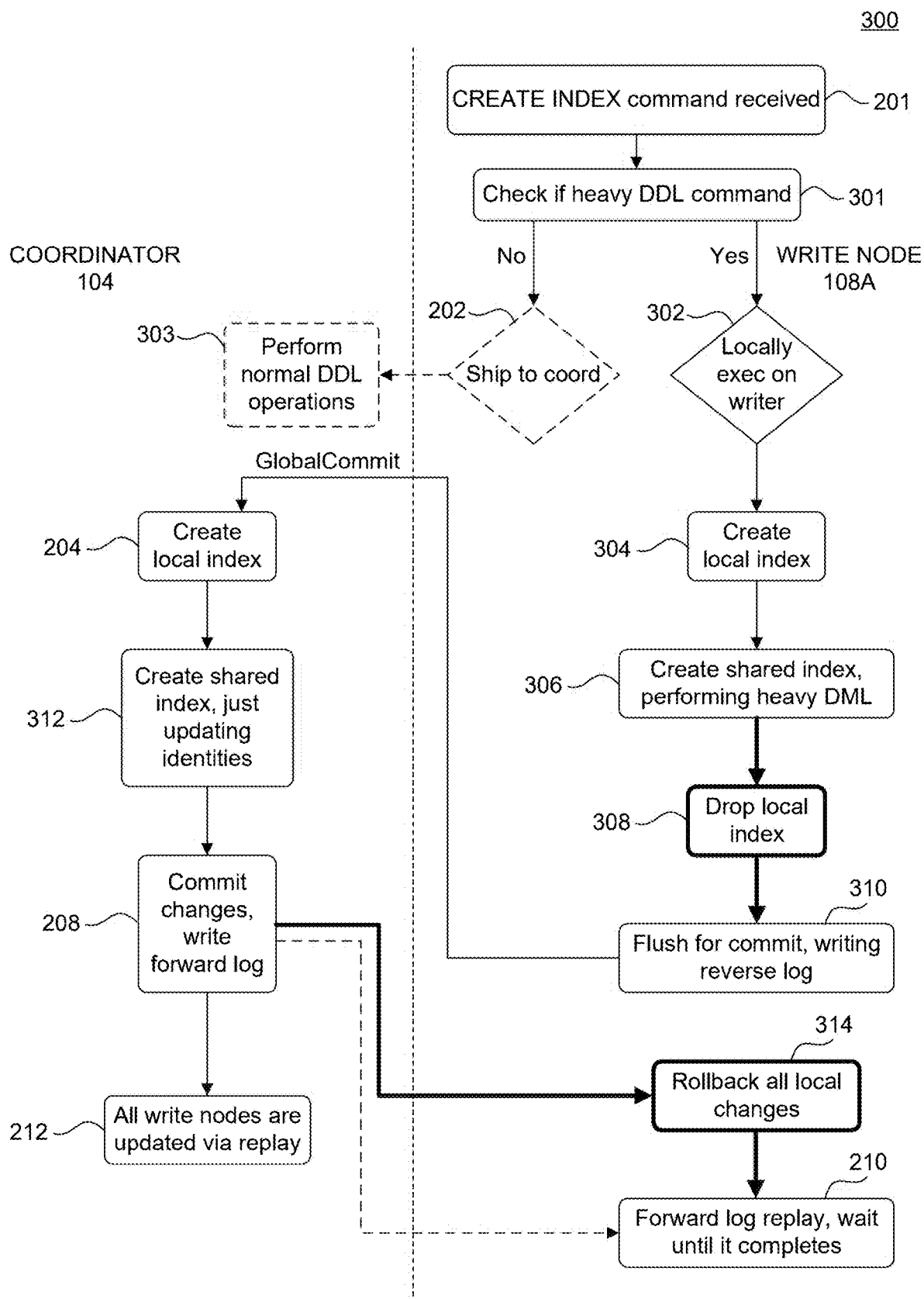
FIG. 3 illustrates an example flow of operations of a schema object creation system (SCS) with enhanced DDL processing, according to some embodiments.

FIG. 3 illustrates an example flow of operations 300 of a schema object creation system (SCS) 102 with enhanced DDL processing, according to some embodiments. Some of the steps of FIG. 3 are similar to those steps described above with respect to FIG. 2 and, as such, are numbered identically.

At 201, a request 110 to create an index is received at writer node 108A. If the request 110 is for DML operations, then write node 108A may perform the DML operations without performing any of the subsequent steps illustrated. If the request 110 is for a DDL operation (e.g., such as a create index command), then operations may resume to step 301. Though FIGS. 2 and 3 includes the example of creating an index, it is understood that other embodiments may include other commands, such as a create materialized view command or other data objects may be processed in a similar manner as described herein.

At 301, write node 108A may check to see if the command of request is a heavy DDL command. A heavy DDL command may include any DDL command that includes one or more DML operations. In some embodiments, write node 108A may include a list of heavy DDL operations. If the request 110 corresponds to or matches an entry on the list, the yes arrow is followed. If the request 110 does not correspond to or does not match an entry on the list, the no arrow is followed.

At 202, the request 110 is provided to coordinator 104. At 204, coordinator 104 may perform normal DDL operations. These normal DDL operations may include, for example, updating a local catalog 124, updating a schema 115, updating a forward log 128, and providing the forward log 128 to one or more write nodes 108 to replay.

At 302, write node 108A has determined that the request 110 is for a heavy DDL operation. As such, write node 108A may perform processing as described below, prior to providing the request 110 to coordinator 104.

At 304, write node 108A may create an index in its local memory 120. Write node 108 may, for example, update its local catalog 118 with a new index. However, this update may be performed in a memory 120 (as illustrated in FIG. 1). In some embodiments, write node 108A may have its own local memory that is used to perform various DML operations, including storing and/or updating catalog 118.

In some embodiments, coordinator 104 may also include its own memory 125 to perform its own local operations. However, the optimize resources, in some embodiments, the memory 125 of coordinator 104 may be smaller or slower than the memory 120 of write nodes 108 (which may be tasked with more resource intensive DML operations). There may be other resource differences between coordinator 104 and write nodes 108, in which write nodes 108 are allocated with more or faster resources relative to coordinator 104, such as the number of processors, central processing unit speed, memory speed, memory type, amount of memory, etc.

At 306, write node 108A may then create and populate an index in the shared storage 112 (without updating schema 115). The heavy DML operations may include adding, copying, or moving data within shared storage 112, and linking the updated data to the new schema object 114. As noted above, write node 108A may not be authorized to update schema 115, but may modify an existing schema object 114 or create a new schema object 114, and populate the affected schema object 114. However, these schema object changes may not be committed by write nodes 108A. In some embodiments, only coordinator 104 may be authorized to commit these changes (such that they are accessible throughout cluster 106).

At 308, the write node 108A may delete, drop, or remove the index (or other schema object) that it previously added to its local catalog 118. then drop its local index out of its memory and catalog. Though described with respect to write node 108A, it is understood that the operations of FIG. 3 may be performed by any of the write nodes 108 which receive a request 110.

At 310, write node 108A may write to reverse log 122. Reverse log 122 may be a log of operations performed by a write node 108, which are then provided to coordinator 104 to commit. In the example illustrated, the reverse log 122 may include metadata or a pointer to the location of the new schema object 114 in shared storage 112, as modified/created and populated by write node 108A.

At 204, coordinator 104 may create a new index in its local catalog 124. At 312, coordinator may update schema with the metadata of the populated schema object 114 (as created by write node 108A). This may allow coordinator 104 to perform a lightweight DDL operation, and leverage the capabilities and performance of the DML operations in step 306 performed by the resource-heavy write node 108A.

At 208, coordinator 104 may commit the changes to schema 115 and update the forward log 128.

Step 314 the write node 108A may roll back all its changes it made locally with respect to request 110, returning itself to a state it was in prior to request 110 at 201. In some embodiments, steps 308 and 314 may performed together at step 308 prior to step 310, or together at step 314 when all changes are rolled back.

At 210, the forward log 128 may be replayed by the various write node 108A-D. At 212, the writers have been updated and the next request 110 may be processed.

Figure 4:
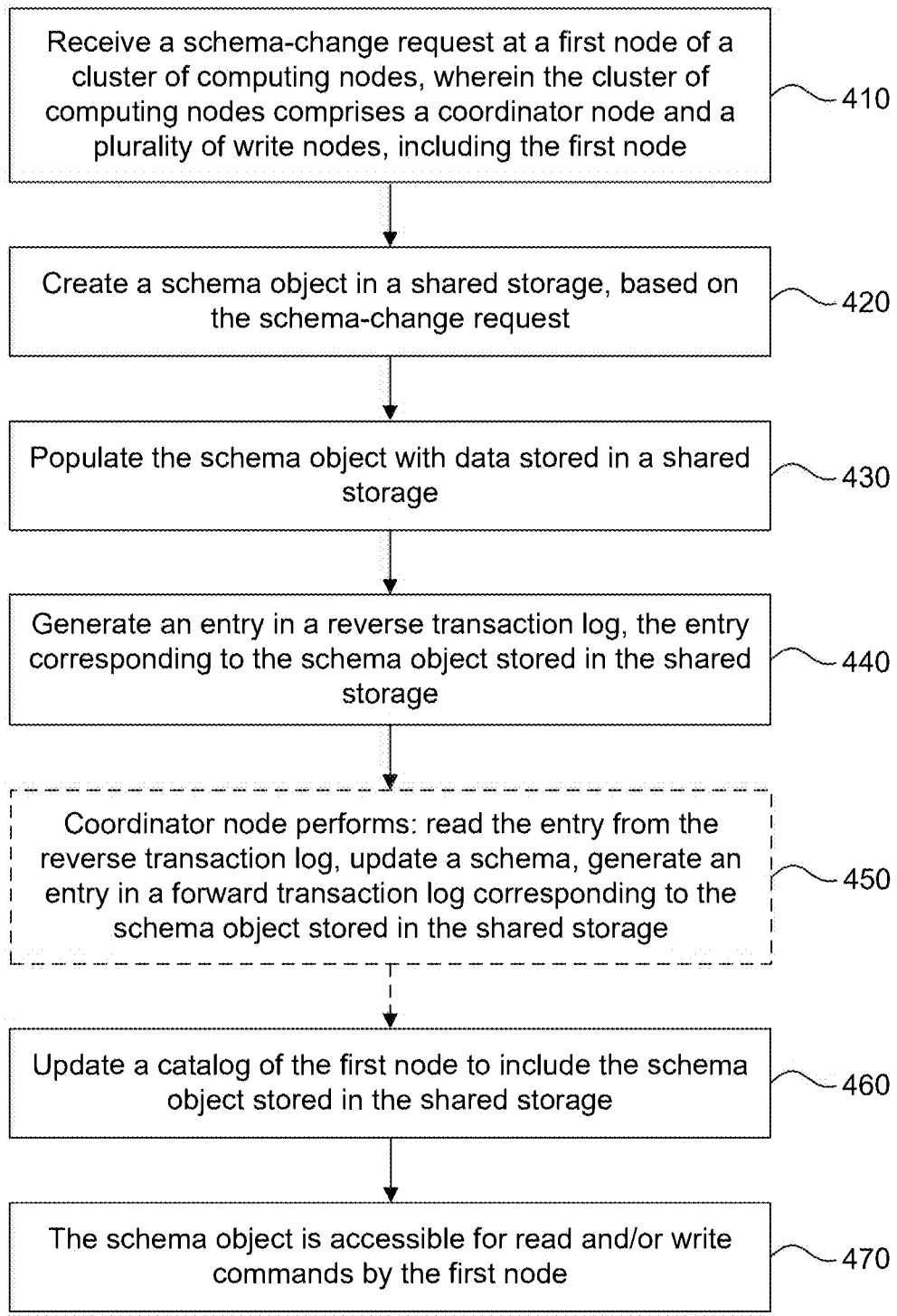
FIG. 4 is a flowchart illustrating example operations for providing a schema object creation system (SCS), according to some embodiments.

FIG. 4 is a flowchart 400 illustrating example operations for providing a schema object creation system (SCS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1.

In 410, a schema-change request is received at a first node of a cluster of computing nodes, wherein the cluster of computing nodes comprises a coordinator node and a plurality of write nodes, including the first node. For example, write node 108A of cluster 106 may receive request 110 to change the schema 115. The request 110 may be a request to modify or create a new schema object 114.

The DML or write operations performed by the write nodes 108A-D to the data 116 of shared storage 112 may be managed by coordinator 104. In some embodiments, the write nodes 108 may be configured with greater computing resources than the coordinator 104 due to the generally more computationally intensive nature of DML operations performed by the write nodes 108 relative to DDL operations performed by the coordinator 104.

In 420, a schema object is created in a shared storage, based on the schema-change request. For example, write node 108A may create schema object 114 in shared storage 112. In some embodiments, write node 108A may also update its own catalog 118 to indicate the existence of a new or modified schema object 114, prior to creating or modifying the schema object 114 on shared storage 112.

In 430, the schema object is populated with data stored in a shared storage. For example, write node 108A may populate schema object 114 with data 116 in shared storage 112. The populated schema object 114 may not yet be committed to schema 115, or accessible to other write nodes 108B-D.

In 440, an entry is generated in a reverse transaction log, the entry corresponding to the schema object stored in the shared storage. For example, write node 108A may update reverse log 122 with the metadata indicating that schema object 114 has been created on shared storage 112. In some embodiments, write node 108A may roll back its changes to its own local catalog 118.

In 450, the coordinator node reads the entry from the reverse transaction log, updates a schema, and generates an entry in a forward transaction log corresponding to the schema object stored in the shared storage. For example, coordinator 104 may receive an indication that reverse log 122 has been updated, update the schema 115 based on the metadata to indicate the new or updated schema object 114, and write a corresponding entry in a forward log 128. In some embodiments, coordinator 104 may also update its own local catalog 124.

In 460, a catalog of the first node is updated to include the schema object stored in the shared storage device. For example, write node 108A (and the remaining write nodes 108B-D, and in some embodiments the read nodes 130A-C) may update their local catalogs 118 (at each node) in accordance with the entry of forward log 128, to indicate the existence of the new or updated schema object 114.

In 490, schema object is made accessible for read and/or write commands by the first node. For example, once the catalog 118 of the write nodes 108A-D have been updated, the schema object 114 may be accessible to the write nodes 108A-D and read nodes 130A-C for accessing.

Figure 5:
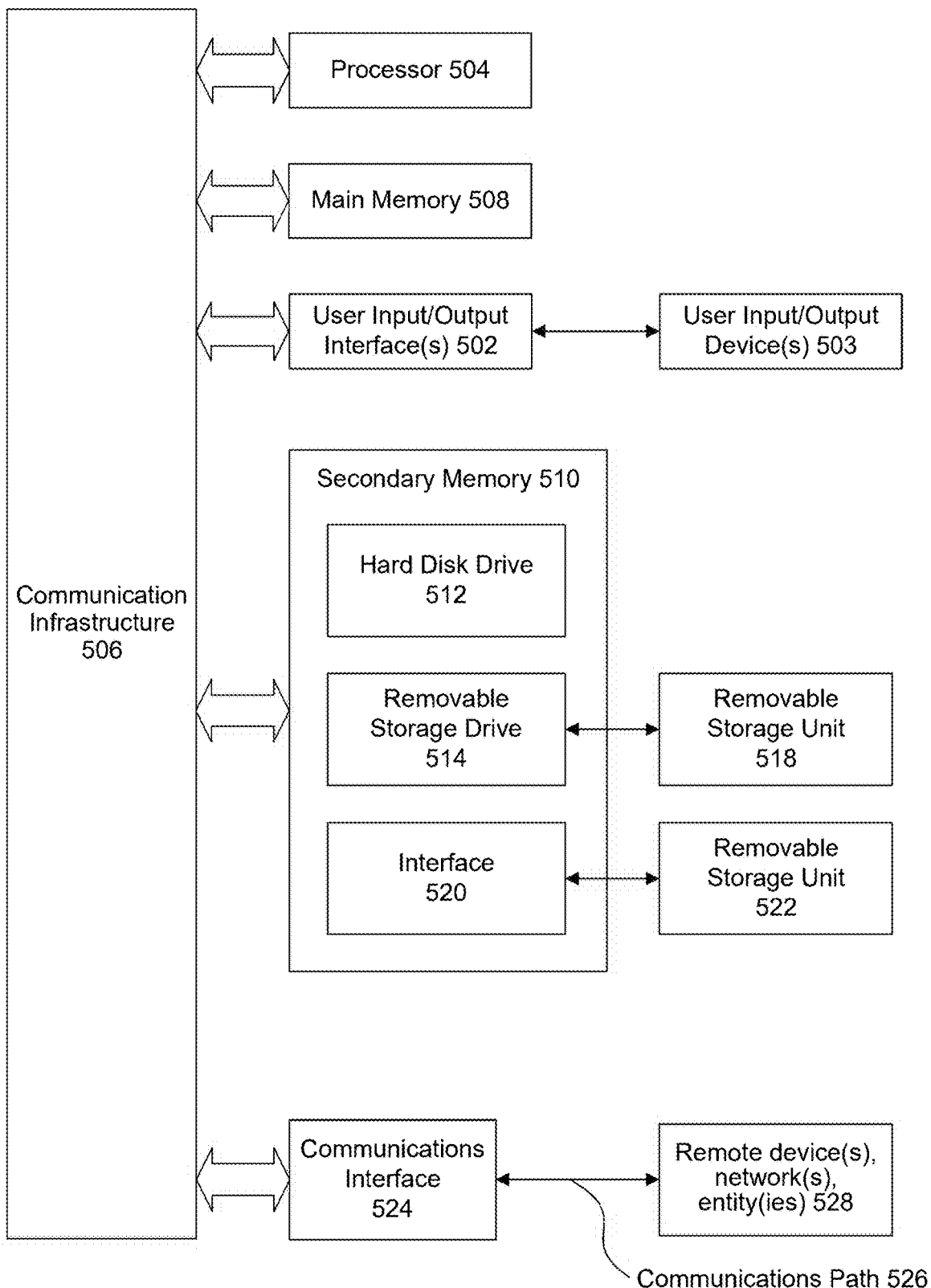
FIG. 5 is example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer-implemented method comprising:
receiving a schema-change request at a first node of a cluster of computing nodes, wherein the cluster of computing nodes comprises a coordinator node and a plurality of write nodes, including the first node;
creating, by the first node, a schema object in a shared storage, based on the schema-change request;
populating the schema object with data stored in the shared storage;

generating an entry in a reverse transaction log, the entry corresponding to the schema object stored in the shared storage, wherein the coordinator node is configured to read the entry from the reverse transaction log, update a schema, and generate an entry in a forward transaction log corresponding to the schema object stored in the shared storage; and executing, at the first node, the entry in the forward transaction log, wherein the executing comprises updating a catalog of the first node to include the schema object stored in the shared storage, wherein upon a completion of the updating, the schema object is accessible for read and/or write commands by the first node.

2. The computer-implemented method of claim 1, wherein the schema-change request comprises a request to create an index, and the schema object comprises the index.

3. The computer-implemented method of claim 1, wherein the coordinator node is configured to coordinate write operations performed by the plurality of write nodes to ensure data consistency in the shared storage.

4. The computer-implemented method of claim 1, wherein each of the plurality of write nodes are configured with greater computing resources relative to the coordinator node.

5. The computer-implemented method of claim 1, wherein each of the plurality of write nodes maintains its own catalog of data storage in the shared storage.

6. The computer-implemented method of claim 5, wherein each of the plurality of write nodes executes the entry in the forward transaction log, and updates its own catalog to include the schema object stored in the shared storage.

7. The computer-implemented method of claim 1, wherein the generating the entry in the reverse transaction log comprises including a pointer to the schema object stored in the shared storage.

8. The computer-implemented method of claim 7, wherein the pointer to the schema object stored in the shared storage is provided with the entry in the forward transaction log.

9. The computer-implemented method of claim 1, further comprising:
creating the schema object in the catalog of the first node prior to creating the schema object in the shared storage.

10. The computer-implemented method of claim 9, further comprising:
rolling back any changes made at the first node, including removing the schema object from the catalog of the first node, prior to performing the executing.

11. A system comprising:
a memory; and
at least one processor coupled to the memory and configured to perform operations comprising:
receiving a schema-change request at a first node of a cluster of computing nodes, wherein the cluster of computing nodes comprises a coordinator node and a plurality of write nodes, including the first node;
creating, by the first node, a schema object in a shared storage, based on the schema-change request;
populating the schema object with data stored in the shared storage;
generating an entry in a reverse transaction log, the entry corresponding to the schema object stored in the shared storage, wherein the coordinator node is configured to read the entry from the reverse transaction log, update a schema, and generate an entry in a forward transaction log corresponding to the schema object stored in the shared storage; and
executing, at the first node, the entry in the forward transaction log, wherein the executing comprises updating a catalog of the first node to include the schema object stored in the shared storage, wherein upon a completion of the updating, the schema object is accessible for read and/or write commands by the first node.

12. The system of claim 11, wherein the schema-change request comprises a request to create an index, and the schema object comprises the index.

13. The system of claim 11, wherein the coordinator node is configured to coordinate write operations performed by the plurality of write nodes to ensure data consistency in the shared storage.

14. The system of claim 11, wherein each of the plurality of write nodes are configured with greater computing resources relative to the coordinator node.

15. The system of claim 11, wherein each of the plurality of write nodes maintains its own catalog of data storage in the shared storage.

16. The system of claim 15, wherein each of the plurality of write nodes executes the entry in the forward transaction log, and updates its own catalog to include the schema object stored in the shared storage.

17. The system of claim 11, wherein the generating the entry in the reverse transaction log comprises including a pointer to the schema object stored in the shared storage.

18. The system of claim 17, wherein the pointer to the schema object stored in the shared storage is provided with the entry in the forward transaction log.

19. The system of claim 11, the operations further comprising:
creating the schema object in the catalog of the first node prior to creating the schema object in the shared storage; and
rolling back any changes made at the first node, including removing the schema object from the catalog of the first node, prior to performing the executing.

20. A non-transitory computer-readable medium having instructions stored thereon that, when executed by at least one computing device, cause the at least one computing device to perform operations comprising:
receiving a schema-change request at a first node of a cluster of computing nodes, wherein the cluster of computing nodes comprises a coordinator node and a plurality of write nodes, including the first node;
creating, by the first node, a schema object in a shared storage, based on the schema-change request;
populating the schema object with data stored in the shared storage;
generating an entry in a reverse transaction log, the entry corresponding to the schema object stored in the shared storage, wherein the coordinator node is configured to read the entry from the reverse transaction log, update a schema, and generate an entry in a forward transaction log corresponding to the schema object stored in the shared storage; and
executing, at the first node, the entry in the forward transaction log, wherein the executing comprises updating a catalog of the first node to include the schema object stored in the shared storage, wherein upon a completion of the updating, the schema object is accessible for read and/or write commands by the first node.

* * * * *